(12) United States Patent
Buckley et al.

(10) Patent No.: US 7,826,842 B2
(45) Date of Patent: Nov. 2, 2010

(54) SYSTEM AND METHOD FOR MANAGING FORBIDDEN NETWORK LISTS ON A WIRELESS USER EQUIPMENT (UE) DEVICE

(75) Inventors: Adrian Buckley, Tracy, CA (US); Andrew Allen, Mundelein, IL (US)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/173,031

(22) Filed: Jul. 1, 2005

(65) Prior Publication Data
US 2007/0004408 A1    Jan. 4, 2007

(51) Int. Cl.
*H04W 4/00*     (2009.01)
*H04M 1/00*     (2006.01)

(52) U.S. Cl. .............. 455/435.2; 455/435.1; 455/552.1; 455/432.3

(58) Field of Classification Search .............. 455/435.2, 455/435.1–435.3, 432.1–432.3, 552.1, 418–420, 455/558, 410–411, 551; 370/254, 255, 230
See application file for complete search history.

(56) References Cited

U.S. PATENT DOCUMENTS

| | | | |
|---|---|---|---|
| 5,159,625 | A | 10/1992 | Zicker |
| 5,983,115 | A * | 11/1999 | Mizikovsky ................. 455/512 |
| 5,999,811 | A * | 12/1999 | Molne ...................... 455/432.3 |
| 6,684,082 | B1 * | 1/2004 | McClure ................... 455/552.1 |
| 7,542,451 | B2 * | 6/2009 | Cooper et al. ................ 370/335 |
| 2002/0147012 | A1 * | 10/2002 | Leung et al. ................. 455/433 |
| 2003/0119481 | A1 | 6/2003 | Haverinen et al. |
| 2003/0129979 | A1 * | 7/2003 | Cooper ........................ 455/432 |
| 2003/0165227 | A1 * | 9/2003 | De Beer ................. 379/221.01 |
| 2004/0017798 | A1 | 1/2004 | Hurtta et al. |
| 2004/0054922 | A1 * | 3/2004 | Hiraga et al. ............... 713/200 |

(Continued)

FOREIGN PATENT DOCUMENTS

TW     463510     11/2001

(Continued)

OTHER PUBLICATIONS

European Examination Report; European Patent Office; Jan. 5, 2006; 4 pages.

(Continued)

*Primary Examiner*—George Eng
*Assistant Examiner*—Nam Huynh
(74) *Attorney, Agent, or Firm*—The Danamraj Law Group, P.C.

(57) ABSTRACT

A system and method for managing forbidden network lists on a wireless user equipment (UE) device. In one embodiment, a first database structure is provided that associates a plurality network selection control codes with a corresponding plurality of network selection criteria, the network selection criteria for defining different treatment options for networks identified in a network list associated with the wireless device. A second database structure is populated with a list of networks identified by corresponding network identifiers, wherein each network identifier is associated with a corresponding network selection control code identified in the first database structure. The contents of the database structures, which may be provisioned as part of removable storage module or within a memory of the wireless device, are operable to be updated only by a home network operator.

13 Claims, 6 Drawing Sheets

| Selection control code (SCC) 402 | Selection criterion 404 |
|---|---|
| 0000 | Always forbidden |
| 0001 | Always forbidden unless only network available |
| 0010 | Always forbidden for automatic network selection |
| 0011 | Always forbidden for manual network selection only |
| 0100 | Forbidden for automatic selection unless only network available |
| 0101 | Forbidden for manual selection unless only network available |
| . . . | . . . |
| 0110–1111 | Reserved for future extensions |

400A

U.S. PATENT DOCUMENTS

2004/0203745 A1* 10/2004 Cooper .................... 455/432.1
2005/0227688 A1* 10/2005 Li et al. ................... 455/432.1
2006/0040661 A1* 2/2006 Choi et al. ............... 455/432.3

FOREIGN PATENT DOCUMENTS

| TW | I223941 | 11/2004 |
|---|---|---|
| WO | WO 00/41486 | 7/2000 |
| WO | 0154435 A1 | 7/2001 |
| WO | 2004077860 A1 | 9/2004 |

OTHER PUBLICATIONS

European Search Report; European Patent Office;Nov. 2, 2005; 2 pages.

Canadian Office Action Application No. 2550188; Canadian Intellectual Property Office ; Nov. 3, 2008 ; 3 pages.

European Search Report in EP Application No. 08163967.6; European Patent Office; Feb. 16, 2009; 9 pages.

3GPP TS 23.122; V6.5.0; 3rd Generation Partnership Project; Technical Specification Group Core Network and Terminals; Non-Access-Stratum (NAS) Functions Related to Mobile Station (MS) in Idle Mode (Release 6); GSM Global System for Mobile Communications; Jun. 2005; 34 pages.

3GPP TS 04.08; V7.21.0; 3rd Generation Partnership Project; Technical Specification Group Core Network; Mobile Radio Interface Layer 3 Specification (Release 1998); GSM Global System for Mobile Communications; Dec. 2003; 623 pages.

CF888 User Manual; Publication No. AE/LTZ 123 4459 R2 Ericsson Inc.; 1998; 88 pages.

English Translation of Taiwan Office Action; Application No. 095123970; IPO; Feb. 6, 2009; 4 pages.

English Translation of Taiwan Office Action; Application No. 095123970; IPO; May 26, 2009; 2 pages.

Chinese Office Action; Application No. 200610095696.6; State Intellectual Property Office of People's Republic of China; dated Feb. 5, 2010; 4 pages.

EPO Communication, Application No. 08 163 967.6, European Patent Office, dated Apr. 28, 2010, 5 pgs.

\* cited by examiner

| Selection control code (SCC) 402 | Selection criterion 404 |
|---|---|
| 0000 | Always forbidden |
| 0001 | Always forbidden unless only network available |
| 0010 | Always forbidden for automatic network selection |
| 0011 | Always forbidden for manual network selection only |
| 0100 | Forbidden for automatic selection unless only network available |
| 0101 | Forbidden for manual selection unless only network available |
| ... | ... |
| 0110-1111 | Reserved for future extensions |

*FIG. 4A*

| Network Identifier 422 | Selection control code (SCC) 402 | Application of SCC 424 |
|---|---|---|
| MCC2.MANC1 | 0000 | In region identified with MCC2, MANC1 is always forbidden for all core networks |
| MCC2.MCNC2 | 0000 | In region identified with MCC2, MCNC2 is always forbidden for all access networks (RATs) |
| MCC3.MANC1.MCNC2 | 0011 | In region identified with MCC3, MANC1.MCNC2 cannot be selected for manual network selection |
| ... | ... | ... |

*FIG. 4B*

SYSTEM AND METHOD FOR MANAGING FORBIDDEN NETWORK LISTS ON A WIRELESS USER EQUIPMENT (UE) DEVICE

REFERENCE TO RELATED APPLICATION(S)

This application discloses subject matter related to the subject matter disclosed in the following commonly owned co-pending U.S. patent application(s): (i) "SYSTEM AND METHOD FOR PROVIDING NETWORK ADVERTISEMENT INFORMATION VIA A NETWORK ADVERTISEMENT BROKER (NAB)," filed Apr. 28, 2005; application Ser. No. 11/116,470, in the name(s) of: Adrian Buckley, Paul Carpenter, Nicholas P. Alfano, and Andrew Allen; (ii) "NETWORK SELECTION SCHEME USING A ROAMING BROKER (RB)," filed Apr. 28, 2005; application Ser. No. 11/116,461, in the name(s) of: Adrian Buckley, Paul Carpenter, Nicholas P. Alfano, and Andrew Allen; each of which is hereby incorporated by reference in their entirety.

FIELD OF THE DISCLOSURE

The present patent disclosure generally relates to communication networks. More particularly, and not by way of any limitation, the present patent application is directed to a system and method for managing forbidden network lists on a wireless device.

BACKGROUND

It is well known in the wireless communications art to use a removable module in conjunction with a wireless mobile equipment (ME) device. Such removable modules are typically provisioned with a number of network lists (e.g., a list of forbidden networks) that could be downloaded to the ME device when needed. Also, such lists may be provisioned within a memory integrated into the wireless device.

Currently, it is possible for the wireless device to overwrite a forbidden network list through a manual network selection process or through network selection attempts to a network other than a home network. Since the network operators typically provision and control various network lists including forbidden network lists for modifying or enhancing user experience (e.g., via well known over-the-air or OTA mechanisms), it becomes crucial that effective control over a user's lists be exercised in some fashion. Additionally, such control over the application of network lists facilitates a more uniform user experience through appropriate OTA updates to the network lists.

BRIEF DESCRIPTION OF THE DRAWINGS

A more complete understanding of the embodiments of the present patent disclosure may be had by reference to the following Detailed Description when taken in conjunction with the accompanying drawings wherein:

FIGS. 4A-4B depict additional exemplary database structures that may be utilized by a UE device for facilitating management of PLMN list(s);

DETAILED DESCRIPTION OF THE DRAWINGS

In one embodiment, the present disclosure is directed to a method for managing application of a network list on a wireless device, comprising: providing a first database structure that associates a plurality of network selection control codes with a corresponding plurality of network selection criteria, the network selection criteria for defining different treatment options for networks identified in a network list associated with the wireless device (e.g., an FPLMN list); and providing a second database structure populated with a list of networks identified by corresponding network identifiers, wherein each network identifier is associated with a corresponding network selection control code identified in the first database structure. By way of exemplary implementation, either of the first and second database structures or both may be provisioned as part of a removable storage module (RSM) or within a memory of the wireless device, and are preferably operable to be updated only by a home network operator.

In another embodiment, the present disclosure is directed to a system for managing application of a network list on a wireless device, comprising: a first database structure that associates a plurality of network selection control codes with a corresponding plurality of network selection criteria, the network selection criteria for defining different treatment options for networks identified in a network list associated with the wireless device (e.g., an FPLMN list); and a second database structure populated with a list of networks identified by corresponding network identifiers, wherein each network identifier is associated with a corresponding network selection control code identified in the first database structure. By way of exemplary implementation, the system may be embodied as part of an RSM or within a wireless device.

In a still further embodiment, the present disclosure is directed to a network selection method modulated by application of a network list associated with a wireless device, comprising: scanning by wireless device for discovering at least one network; determining a network identifier associated with the at least one network; determining a selection control code associated with the network identifier; and depending on the selection control code associated with the network identifier, applying a particular selection criterion with respect to the at least one network, wherein the network has been designated as a forbidden network.

Figure 1:
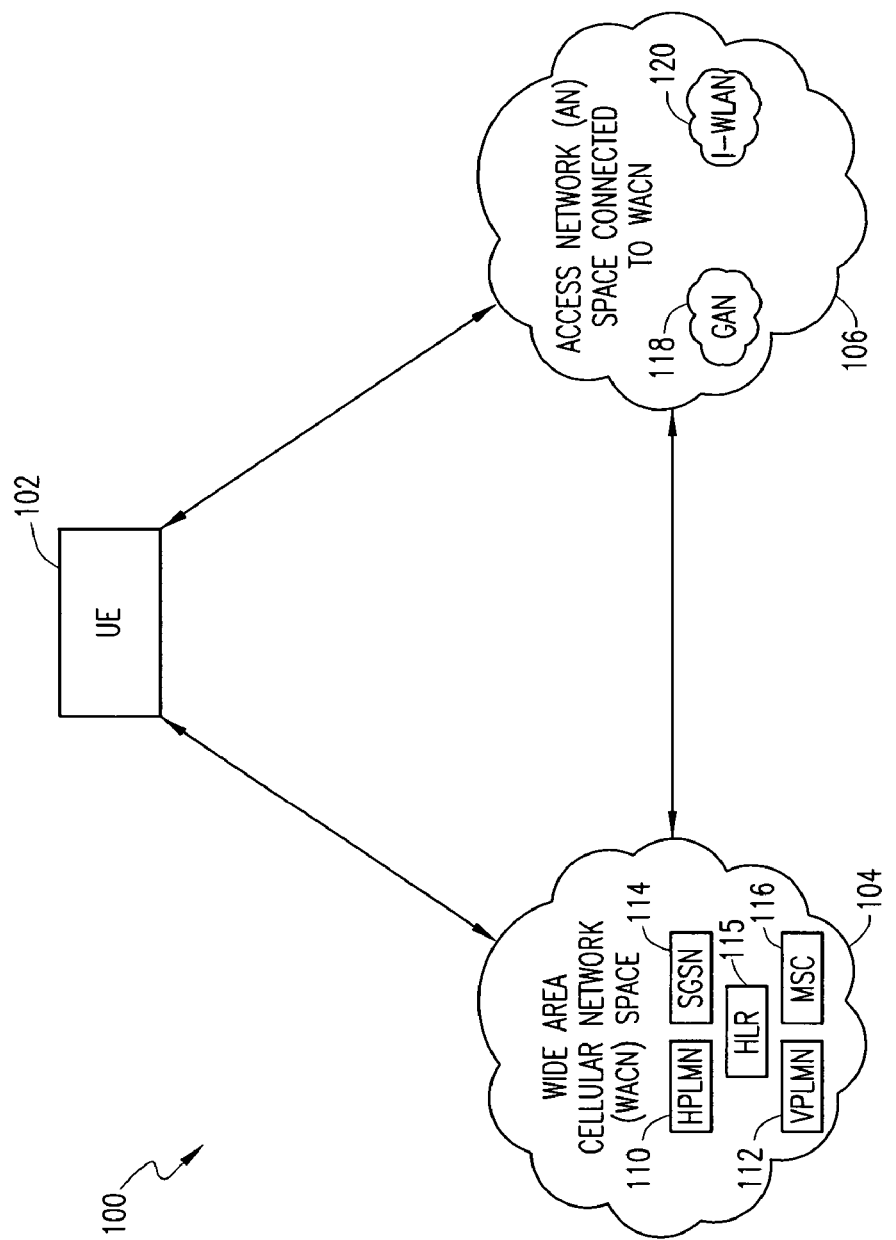
FIG. 1 depicts a generalized network environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein one or more embodiments of the present patent disclosure may be practiced. A generalized wireless user equipment (UE) or mobile equipment (ME) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands and/or radio access technologies (RATs). For example, UE/ME device 102 may operate in the cellular telephony band frequencies as well as Wireless Local Area Network (WLAN) bands. Further, other bands in which the UE device could operate wirelessly may comprise Wi-Max bands or one or more satellite bands. Accordingly, for purposes of the present patent disclosure, those skilled in the art should recognize that the term "UE device" or "wireless device" may comprise a mobile equipment (ME) device (with or without any removable storage module or RSM such as a Universal Subscriber Identity Module (USIM) card, Removable User Identity Module (RUIM) card, a Subscriber Identity Module (SIM) card, or a compact Flash card, etc.) as well as other portable wireless information appliances, also with or without such RSMs.

By way of illustration, the network environment 100 is envisioned as two broad categories of communication spaces capable of providing service to UE device 102 wherein acquisition of network advertisement information may be accomplished in accordance with the teachings set forth herein. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any $3^{rd}$ Generation Partnership Project (3GPP)-compliant network (e.g., 3GPP or 3GPP2), all operating with well known frequency bandwidths and protocols. That is, at least in some embodiments, the term "PLMN" may be deemed to represent various cellular and wireless technologies (e.g., WLAN, WiMax, public safety network implementations, etc.).

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard (IEEE 802.16 and IEEE 802.16e), OpenAir standard, and the Bluetooth standard (IEEE 802.15).

In one embodiment, interfacing between the WACN and AN spaces may be effectuated in accordance with certain standards. For instance, GAN 118 may be interfaced with one or more PLMNs using the procedures set forth in the 3GPP TR 43.901, 3GPP TS 43.318 and 3GPP TS 44.318 documents as well as related documentation. Likewise, WLAN 120 may be interfaced with at least one PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Based on the foregoing, it should be recognized that the service infrastructure of the network environment 100 may be generalized into three broad segments: one or more radio access networks (RANs) (which can include cellular band technologies as well as WLAN technologies), one or more core networks (CNs), and one or more service networks (SNs). Depending on network ownership arrangements and service-level agreements, each RAN may support one or more CNs, each of which in turn may support one or more SNs. Such combinations of infrastructure equipment across multiple owners are sometimes used to create Mobile Virtual Network Operators (MVNOs). In some embodiments, the teachings of the present patent disclosure are equally applicable to MVNOs as to PLMNs. Since each RAN, CN, or SN may be provided with its own network identifier (ID code), numerous RAN-CN-SN combinations may be available in the network environment 100. As will be seen below, various network lists and associated data (e.g., user- or operator-preferred networks (access or visited), user- or operator-prohibited networks (access or visited), lists of network capabilities, frequency data (bands, channels, frequencies, etc.) associated with the listed networks) may be provisioned in the network environment or as part of an RSM (i.e., a module selected from USIM cards, RUIM cards, SIM cards, or compact Flash cards, etc.) operable with the UE device or in the network, which could be provided to the UE device or stored therein in a customized manner for facilitating appropriate network selection while attempting to locate a network for service in the exemplary network environment.

Figure 2:
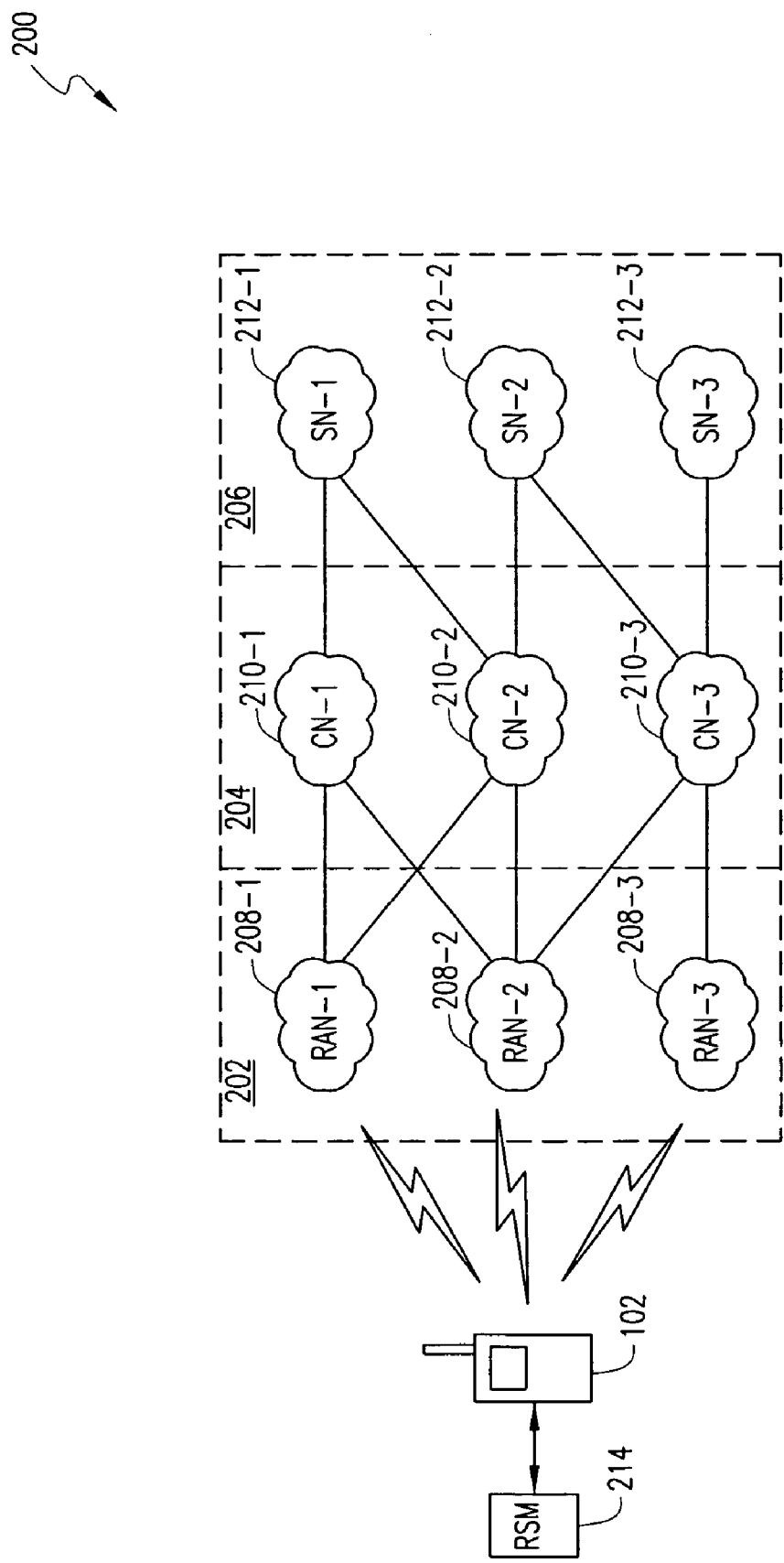
FIG. 2 depicts an exemplary embodiment of a network environment where a wireless user equipment (UE) device is operable to manage one or more Forbidden PLMN (FPLMN) lists in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, wireless UE/ME device 102 is operably disposed for acquiring network advertisement information via scanning from a RAN segment 202 that is coupled to a CN segment 204 which in turn is coupled to an SN segment 206. Three RANs are illustrative: RAN-1 208-1, RAN-2 208-2 and RAN-3 208-3, which are identified with the network codes MANC1, MANC2 and MANC3, respectively. The CN segment 204 is also illustrated with three CNs: CN-1 210-1 (having an ID code of MCNC1), CN-2 210-2 (having an ID code of MCNC2) and CN-3 210-3 (having an ID code of MCNC3). Likewise, the SN segment 206 is illustrated with SN-1 212-1 (having an ID code of MSNC1), SN-2 212-2 (having an ID code of MSNC2) and SN-3 212-3 (having an ID code of MSNC3).

By way of example, RAN-1 208-1 is operable to support connectivity to two CNs, CN-1 210-1 and CN-2 210-2. In similar fashion, RAN-2 208-2 supports three CNs and RAN-3 208-3 supports only one CN. Each CN supports connectivity to one or more SNs: e.g., CN-3 210-3 connects to SN-2 212-2 as well as SN-3 212-3. Given the interconnectivity of the RAN/CN/SN segments, several combinations of identification codes may be obtained for purposes of uniquely identifying the various RAN-CN-SN combinations that the wireless UE device 102 can potentially discover and select from. For instance, with a suitable Mobile Country Code (MCC) being included, the three ID code combinations associated with RAN-1 208-1 are:

[MCC.MANC1.MCNC1.MSNC1];
[MCC.MANC1.MCNC1.MSNC2]; and
[MCC.MANC1.MCNC2.MSNC2].

Likewise, the ID code combinations associated with RAN-2 208-2 are:

[MCC.MANC2.MCNC1.MSNC1];
[MCC.MANC2.MCNC1.MSNC2];
[MCC.MANC2.MCNC2.MSNC2];
[MCC.MANC2.MCNC3.MSNC2]; and
[MCC.MANC2.MCNC3.MSNC3].

The two ID code combinations associated with RAN-3 208-3 are: [MCC.MANC3.MCNC3.MSNC2] and [MCC.MANC3.MCNC3.MSNC2]. As described in detail in the related U.S. patent application entitled "SYSTEM AND METHOD FOR PROVIDING NETWORK ADVERTISEMENT INFORMATION VIA A NETWORK ADVERTISEMENT BROKER (NAB)," filed Apr. 28, 2005; application Ser. No. 11/116,470, and referenced hereinabove, the UE device can discover applicable network ID code information either in an initial scan procedure (i.e., when the device is not registered on any networks) or in a background scan procedure (i.e. when the device is registered on a network).

Given the diversity of the exemplary network environment 100 described earlier with respect to FIG. 1, it is envisaged that scanning may be effectuated in a frequency band in which at least one of the following technologies is operating: GERAN (without EDGE), GERAN (with EDGE), an IDEN network, a CDMA/CDMA2000/TDMA network, a UMTS network, and so on. Additionally, where WLAN access capability is included, scanning may be effectuated in a frequency band compliant with a WLAN standard selected from: IEEE 802.11b standard, IEEE 802.11a standard, IEEE 802.11g standard, HiperLan standard, HiperLan II standard, Wi-Max standard, OpenAir standard, and Bluetooth standard.

An RSM card 214 is operable to be coupled to the wireless UE/ME device 102, wherein a number of network lists and associated frequency data may be provisioned by network operators, etc. When an RSM is present and the UE device is first turned on, the storage module(s) of the UE device may be updated with any information stored in the RSM. Thus, in one embodiment, the RSM could be programmed with the most current frequency information when it is supplied to a subscriber. The data in the RSM may, for example, add extra frequencies to the default list of frequencies, or raster of frequencies, stored in the device for searching or scanning. Alternatively or additionally, the data in the RSM may modify the frequency data already stored in the device so that those frequencies which are not to be used could be removed, or marked in a way that they are not to be scanned as part of a search strategy. As will be seen below, suitable database structures may be provisioned in the RSM or in the memory of a wireless device for storing applicable frequency data, network list data, among others. Furthermore, additional operator-controlled database structures may be provisioned as well for purposes of managing various forbidden network lists in accordance with the teachings of the present disclosure.

Figure 3:
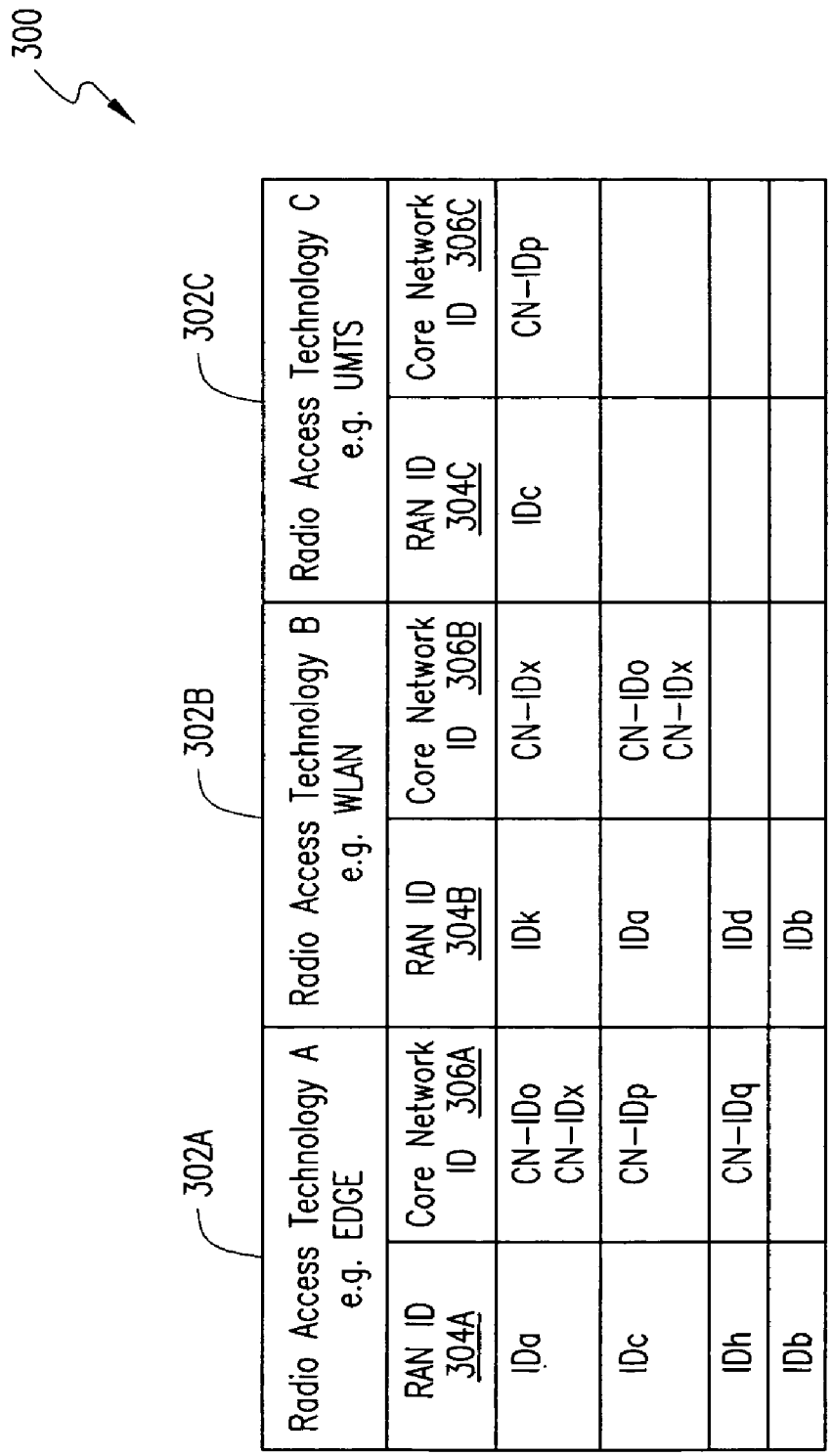
FIG. 3 depicts an exemplary database structure associated with a PLMN list that is operable to be managed in accordance with the teachings of the present patent disclosure.

Referring now to FIG. 3, depicted therein is an exemplary database structure that may be provided, either partially or in any combination, as part of an RSM, or stored in memory integrated within a wireless device, or provisioned at a network node (e.g., a home network node or a broker associated therewith) from which network list information may be selectively downloaded to the wireless device for purposes of the present patent disclosure. At the outset, it should be appreciated that the various exemplary database structures set forth in the present patent disclosure may typically be implemented as configurable databases where the entries, elements or other contents can be modified via over-the-air (OTA) methods. For example, a network operator can add, delete, or modify any portion of the relevant network list database(s) as well as selection control database(s). In particular, reference numeral 300 in FIG. 3 refers to an exemplary database structure that may be provided as an operated-based list, a user-based list or an enterprise-based list, or any combination thereof, for facilitating network selection preferences and prohibitions according to one aspect of the present patent disclosure. In one embodiment, the database structure 300 is configured as an operator-defined network list that specifies a plurality of network IDs which should be considered as forbidden networks in one or more radio access technologies, wherein the network IDs are populated by the operator. In another embodiment, the database structure 300 may be configured as one or more user-defined network lists, with one list per user using the wireless UE device, for example, wherein the data entries relate to user-defined forbidden networks. Each such list may be accessed by the users upon identifying themselves to the device, wherein the contents of the list (i.e., network IDs) are populated by the respective users. In yet another embodiment, the database structure 300 may be configured as a list of network IDs that are forbidden by an enterprise owning the wireless devices for the benefit of its employee-users.

Irrespective of the particular configuration, the database structure 300 defines a plurality of radio access technologies, e.g., EDGE technology 302A, WLAN technology 302B, and UMTS technology 302C, wherein a number of RAN IDs are provided for each technology. As illustrated in FIG. 3, column 304A identifies multiple RAN IDs for the EDGE technology, each RAN supporting one or more core networks identified in corresponding column 306A. Likewise, columns 304B/306B and columns 304C/306C are provided for the WLAN and UMTS technologies respectively. As one skilled in the art may appreciate, the various IDs can be Service Set IDs (SSIDs) (for WLAN), SIDs (for IS-95 and IS-136), or [MCC, MNC] combinations (for GSM, where MNC identifies a Mobile Network Code).

Similar to the forbidden or barred network lists set forth above, an analogous database structure may be provided that identifies one or more networks that are preferred. Such a list of preferred networks may be configured as, for example, an operator-preferred RAN list (i.e., specified by an operator), enterprise-preferred RAN list (i.e., specified by an enterprise), operator-preferred CN list (i.e., specified by an operator), and enterprise-preferred CN list (i.e., specified by an enterprise).

Additionally, the provisioning of various preferred and barred/forbidden network lists may be accompanied with appropriate device-based logic or RSM-based logic for specifying the order in which to use them in connection with scanning and network selection. Moreover, each country may have its own regulatory requirements as to which list should take precedence. An enterprise company for instance may forbid access to a public WLAN access point that operates in the vicinity of the company's premises. Further, certain additional logic may be necessary for specifying the scanning behavior as well, since there may be a number of bands on per-technology basis in which the device is capable of scanning. For instance, a list ordering scheme or associated logic may be provided with the device whereby a particular priority order is imposed on the various network lists. If no particular hierarchy/priority is specified, then a default rule may come into play such as, e.g., an operator-defined list has a higher priority than an enterprise-defined list, which in turn has a higher priority than a user-defined list. Additional details regarding list prioritization and scanning behavior may be found in the following commonly owned co-pending U.S. patent applications: (i) "NETWORK SELECTION SCHEME USING A ROAMING BROKER (RB)" filed Apr. 28, 2005; application Ser. No. 11/116,461; and (ii) "SYSTEM AND METHOD FOR PROVIDING NETWORK ADVERTISEMENT INFORMATION VIA A NETWORK ADVERTISEMENT BROKER (NAB)" filed Apr. 28, 2005; application Ser. No. 11/116,470; each of which has been referenced hereinabove.

FIGS. 4A and 4B depict exemplary database structures that may be utilized by a wireless device or UE for facilitating management of PLMN list(s) in accordance with the teachings of the present disclosure. As alluded to before, the illustrated database structures may be provisioned, either individually, partially, or in any combination, as part of an RSM or within the memory of a wireless device to which the RSM is operable to be coupled. Preferably, these databases are operable to be written to only once, upon providing the user name and a password associated therewith.

A first database structure 400A is operable to associate a plurality of network selection control codes (SCCs) 402 with a corresponding plurality of network selection criteria 404 related to the management of network lists (e.g. user-defined forbidden network lists, operator-defined forbidden network lists, enterprise-defined forbidden network lists, etc. that have been described hereinabove). As illustrated, SCC 402 may be comprised of a binary code, allowing for a number of selection criteria. For instance, a 4-bit code can support up to 16 selection criteria, although SCCs of variable bit sizes can support any number of selection treatments. By way of example, an SCC of [0000] indicates that all networks that have been associated with the code [0000] should be always forbidden, which cannot be overridden by the user even during manual selection. In another example, an SCC of [0001] indicates that all networks having been associated with the code [0001] should always be forbidden, except when they are the only networks available for selection. Likewise, SCCs of [0010] and [0011] indicate, respectively, that such networks should always be forbidden for automatic selection only or for manual network selection only. Additional treatment options may be configured by the network operator at the time of provisioning to define further modalities of application of a forbidden network list on a wireless device.

A second database structure 400B is preferably populated with a list of networks identified by corresponding network identifiers 422, wherein each network identifier is mapped to or otherwise associated with a corresponding SCC 402. Reference numeral 424 exemplifies how the application of an SCC may modulate a wireless device's network selection process and behavior. Where an exemplary network identifier [MCC2.MANC1] is mapped to the code [0001], the access network identified by [MANC1] is always forbidden for all core networks in a geographic region identified by [MCC2]. In a second example, the network identifier [MCC2.MCNC2] is associated with the code [0000] to indicate that the core network identified by [MCNC2] is always forbidden for all access networks and technologies in the geographic region identified by [MCC2]. Likewise, in a third example, the network identifier [MCC3.MANC1.MCNC2] is associated with the code [0011] to indicate that the particular AN/CN network combination identified by the codes [MANC1] and [MCNC2] cannot be selected for manual network selection in the geographic region identified by [MCC3].

Those skilled in the art should recognize that database structures or logic similar to the databases 400A and 400B described above may be provisioned for other types of network lists as well, e.g., operator-defined preferred network lists, user-defined preferred network lists, and enterprise-defined preferred network lists, etc. Furthermore, appropriate prioritization logic may also be interfaced with the selection control databases 400A and 400B to further modulate the selection behavior. Additionally or alternatively, the selection control databases may be integrated together into a single structure, or may be integrated with other structures such as network lists, either individually, partially, or in any combination, depending on a particular implementation and provisioning.

Preferably, the database structures set forth above may be provisioned and updated only by a network operator (e.g., a home network operator associated with the wireless device). By implementing a "network blacklist" scheme facilitated by the database structures 400A/400B, a number of capabilities may be realized: (i) prevent access to networks on a list by automatic selection; (ii) prevent access to networks on a list by automatic selection except when no other networks are available; (iii) prevent access to networks on a list by automatic and manual selection (i.e., removal of networks on an operator-defined blacklist by manual selection is prevented; and (iv) prevent access to networks on a list by automatic and manual selection except when there are no other networks are available for selection.

Figure 5:
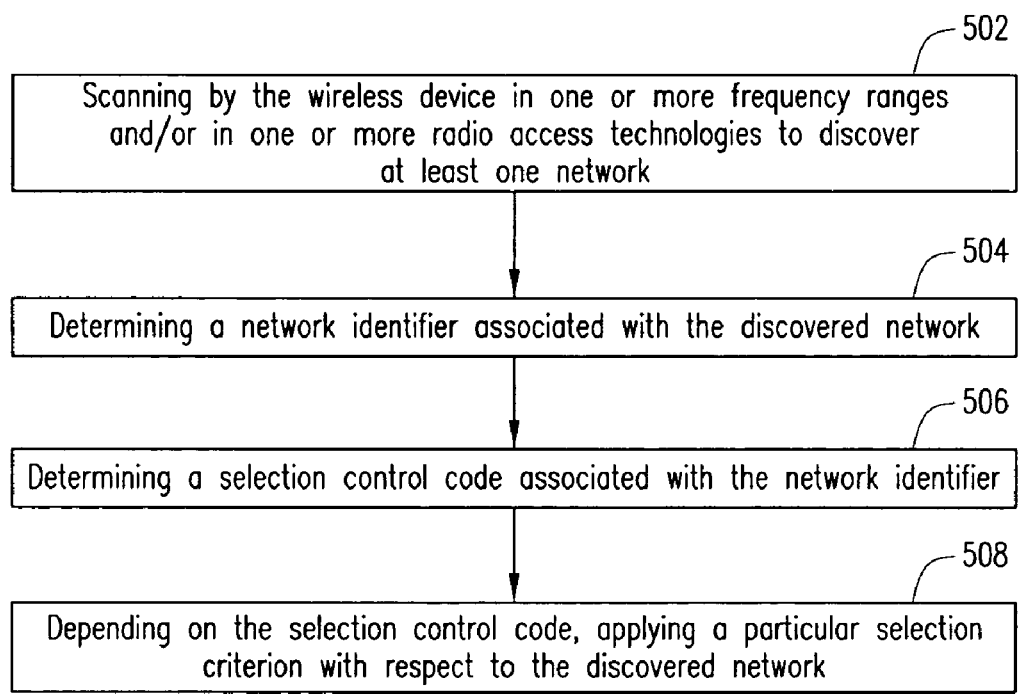
FIG. 5 is a flowchart associated with an embodiment of the present patent disclosure.

FIG. 5 is a flowchart associated with an embodiment of the present patent disclosure wherein a network selection method is disclosed that is modulated by application of a network list associated with a wireless device. Upon scanning by the wireless device in one or more frequency ranges and/or in one or more radio technologies, at least one network may be discovered (block 502), whose identity information is decoded to determine a network identifier associated therewith (block 504). A selection control code associated with the network identifier is then determined (block 506), e.g., by way of querying a suitable data structure such as the database structures described above with reference to FIGS. 4A and 4B. Depending on the selection control code, a particular selection criterion is applied to the discovered network (block 508).

Figure 6:
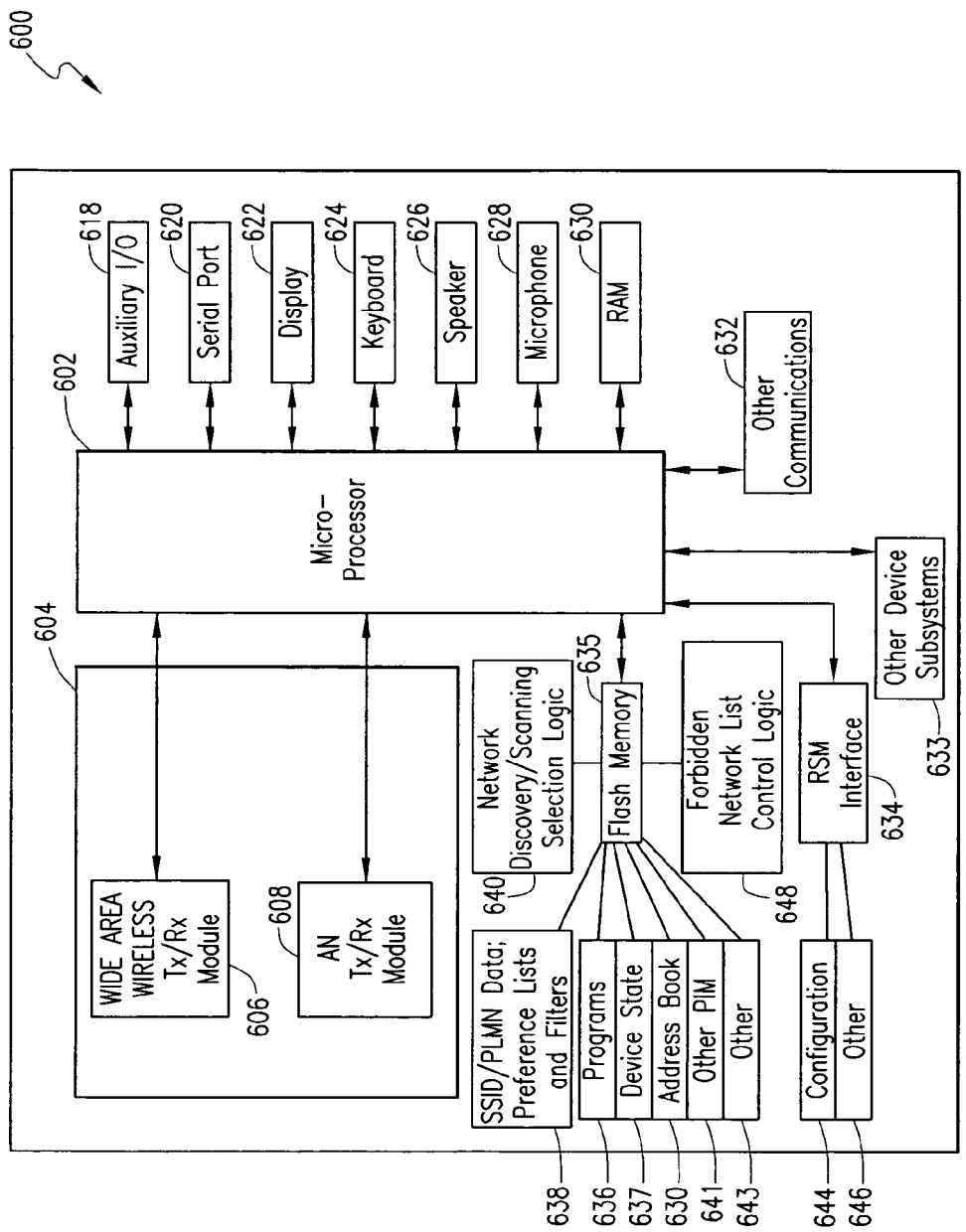
FIG. 6 depicts a block diagram of an embodiment of a wireless UE device according to the teachings of the present patent disclosure.

FIG. 6 depicts a block diagram of an embodiment of a wireless device or UE according to the teachings of the present patent disclosure. It will be recognized by those skilled in the art upon reference hereto that although an embodiment of UE 102 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of UE 600 is operably coupled to a communication subsystem 604 which includes transmitter/receiver (transceiver) functionality for effectuating multi-mode scanning and communications over a plurality of bands. By way of example, a wide area wireless Tx/Rx module 606 and a wireless AN Tx/Rx module 608 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 604 may be dependent upon the communications networks with which the UE device is intended to operate. In one embodiment, the communication subsystem 604 is operable with both voice and data communications.

Microprocessor 602 also interfaces with further device subsystems such as auxiliary input/output (I/O) 618, serial port 620, display 622, keyboard 624, speaker 626, microphone 628, random access memory (RAM) 630, a short-range communications subsystem 632, and any other device subsystems generally labeled as reference numeral 633. To control access and manage the device configuration, an RSM (SIM/RUIM/USIM) interface 634 is also provided in communication with the microprocessor 602. In one implementation, RSM interface 634 is operable with an RSM card having a number of key configurations 644 and other information 646 such as identification and subscriber-related data as well as one or more SSID/PLMN lists and database filters described in detail hereinabove.

Operating system software and other control software may be embodied in a persistent storage module (i.e., non-volatile storage) such as Flash memory 635. In one implementation, Flash memory 635 may be segregated into different areas, e.g., storage area for computer programs 636 as well as data storage regions such as device state 637, address book 639, other personal information manager (PIM) data 641, and other data storage areas generally labeled as reference numeral 643. Additionally, appropriate network discovery/selection logic 640 may be provided as part of the persistent storage for executing the various network discovery/scanning and network selection procedures set forth in the preceding sections. Further, another logic module 648 is provided for facilitating forbidden network list control logic, etc. Associated therewith is a storage module 638 for storing the SSID/PLMN lists, selection/scanning filters, capability indicators, et cetera, also described in detail hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A wireless user equipment (UE) device, comprising:
   a communication subsystem that includes transceiver functionality for effectuating multi-mode scanning and communications over a plurality of bands;
   a component configured to discover at least one network and to determine an identification code combination associated with said at least one network, the identification code combination comprising a geographic designation and at least one of an access network identification code and a core network identification code;
   a component configured to determine an encoded selection control code associated with said identification code combination, said encoded selection control code being selected from a plurality of network selection control codes; and
   a component configured to apply a particular selection criterion for modulating selection behavior with respect to said at least one network in dependence on said encoded selection control code, wherein at least one of said encoded network selection control codes is associated with a selection criterion which forbids a user of said wireless device from removing a network from a list of forbidden networks during manual network selection, said list being provisioned by a home network operator of said wireless device.

2. The wireless UE device as recited in claim 1, wherein at least one of said first and second database structures is stored on a removable storage module operable to be coupled to said wireless device.

3. The wireless UE device as recited in claim 1, wherein at least one of said first and second database structures is stored in a memory module integrated within said wireless device.

4. The wireless UE device as recited in claim 1, wherein at least one of said first and second database structures is operable to be updated only by a home network operator associated with said wireless device.

5. The wireless UE device as recited in claim 1, wherein said network list comprises a user-defined forbidden network list.

6. The wireless UE device as recited in claim 1, wherein said network list comprises an operator-defined forbidden network list.

7. The wireless UE device as recited in claim 1, wherein said network list comprises an enterprise-defined forbidden network list.

8. A network selection method modulated by application of a network list associated with a wireless device, comprising:
   scanning by said wireless device for discovering at least one network;
   determining an identification code combination associated with said at least one network, the identification code combination comprising a geographic designation and at least one of an access network identification code and a core network identification code;
   determining an encoded selection control code associated with said identification code combination, said encoded selection control code being selected from a plurality of network selection control codes; and
   depending on said encoded selection control code, applying a particular selection criterion for modulating selection behavior with respect to said at least one network, wherein at least one of said encoded network selection control codes is associated with a selection criterion which forbids a user of said wireless device from removing a network from a list of forbidden networks during manual network selection, said list being provisioned by a home network operator of said wireless device.

9. The network selection method modulated by application of a network list associated with a wireless device as recited in claim 8, wherein said scanning is performed as an initial scan procedure.

10. The network selection method modulated by application of a network list associated with a wireless device as recited in claim 8, wherein said scanning is performed as a background scan procedure.

11. The network selection method modulated by application of a network list associated with a wireless device as recited in claim 8, wherein said list of networks comprises at least one of a user-defined forbidden network list, an operator-defined forbidden network list, and an enterprise-defined forbidden network list.

12. The network selection method modulated by application of a network list associated with a wireless device as recited in claim 8, wherein said database structure is stored on a removable storage module operable to be coupled to said wireless device.

13. The network selection method modulated by application of a network list associated with a wireless device as recited in claim 8, wherein said database structure is stored in a memory module integrated within said wireless device.

* * * * *

UNITED STATES PATENT AND TRADEMARK OFFICE
CERTIFICATE OF CORRECTION

PATENT NO. : 7,826,842 B2  Page 1 of 1
APPLICATION NO. : 11/173031
DATED : November 2, 2010
INVENTOR(S) : Adrian Buckley et al.

It is certified that error appears in the above-identified patent and that said Letters Patent is hereby corrected as shown below:

Column 7,
Line 63, "[0001]" should read -- [0000] --.

Signed and Sealed this
Twenty-fifth Day of January, 2011

David J. Kappos
*Director of the United States Patent and Trademark Office*